United States Patent [19]

Nozue et al.

[11] Patent Number: 5,715,792

[45] Date of Patent: Feb. 10, 1998

[54] METHOD FOR CONTROLLING THE ADVANCE ANGLE OF A POWER ENGINE

[75] Inventors: Yutaka Nozue; Tsuyoshi Akaishi; Yoshihiro Kaneko; Tamotsu Iwasaki, all of Gunma-ken, Japan

[73] Assignee: Mitsuba Corporation, Japan

[21] Appl. No.: 634,058

[22] Filed: Apr. 17, 1996

[30]     Foreign Application Priority Data

Apr. 19, 1995 [JP] Japan ................................. 8-117872
Feb. 28, 1996 [JP] Japan ................................. 8-069368

[51] Int. Cl.⁶ ........................................................ F02P 5/00
[52] U.S. Cl. ........................................................... 123/416
[58] Field of Search ................................. 123/416, 414, 123/422; 364/431.05, 431.12

[56]     References Cited

U.S. PATENT DOCUMENTS

| | | | |
|---|---|---|---|
| 4,814,997 | 3/1989 | Matsumura et al. | 364/431.05 |
| 4,841,932 | 6/1989 | Hansen et al. | 123/416 |
| 4,930,477 | 6/1990 | Nanyoshi et al. | 123/422 |
| 5,172,669 | 12/1992 | Nakamura | 123/416 |
| 5,176,117 | 1/1993 | Motose et al. | 123/414 |
| 5,184,594 | 2/1993 | Saitoh et al. | 12/571 |
| 5,297,048 | 3/1994 | Gauer | 364/431.12 |
| 5,383,433 | 1/1995 | Fiorenza, II | 123/416 |

*Primary Examiner*—Raymond A. Nelli
*Attorney, Agent, or Firm*—Skjerven Morrill MacPherson Franklin & Friel; Thomas S. MacDonald

[57]     ABSTRACT

Provided is a method for controlling an advance angle of a power engine which can associate the rotational speed or be rotational period with the advance time period by using a single small look up table in a simple manner, and can be implemented by using a relatively small storage device. Because of provision of the steps of detecting a rotational period of a power engine as a binary number consisting of a first number of bits; extracting a second number of bits from the binary number, the second number being smaller than the first number; obtaining a rotational period parameter from the extracted bits or by convening the extracted bits by an arithmetic process based on the first number, the second number, and a minimum value of the rotational period of the engine; and determining an advance angle for each given rotational speed of the engine by looking up a table specifying a relationship between the rotational period parameter and the advance angle.

4 Claims, 3 Drawing Sheets

METHOD FOR CONTROLLING THE ADVANCE ANGLE OF A POWER ENGINE

TECHNICAL FIELD

The present invention relates to a method for controlling the advance angle of a power which is suitable for controlling the ignition timing of a spark plug of an internal combustion engine, and the angle of the switching signal for commutating the electric power supplied to a brushless motor according to the rotational speed of the engine, and in particular to a method for controlling the advance angle of a power engine by determining the advance angle by looking up a table.

BACKGROUND OF THE INVENTION

The ignition timing of an internal combustion engine is required to be changed according to the operating condition of the engine such as the load and the rotational speed of the engine, and, conventionally, it has been mechanically controlled by using a centrifugal governor or the like. It is known that as the rotational speed of the engine increases, not only the advance angle required to be increased (hence the advance time period is required to be decreased) but also a progressively finer control becomes necessary.

Recently, to the end of achieving an optimum ignition timing control, there has been a growing tendency to use electronic ignition timing control systems which detect the rotational speed of the engine, and convert the detected speed into digital data.

According to such an electronically controlled ignition timing control system, after the rotational speed of the engine is detected and converted into digital data, an advance time period corresponding to the rotational speed is determined from a look up table. If the rotational speed or the rotational period is directly associated with the corresponding advance time period in a look up table, the table becomes unacceptably large. For this reason, it has been customary to convert each value of the rotational speed or the rotational period into one of n number of parameters N by using a first table, and to determine the advance angle from the parameter N by using a second table. Because a finer control becomes necessary as the rotational speed increases, it has been customary to define the first table so that each value of the parameter N is associated with a number or rotational speed values, and this number is progressively diminished to one or, in other words, the resolution power is increased, as the rotational speed is increased.

However, two look up tables are required, and this means that a relatively large memory capacity is necessary although it may be smaller than that required for directly associating the rotational speed with the advance time period. A similar problem exists when controlling the advance angle of the switching signal for commutating the electric power supplied to a brushless motor.

BRIEF SUMMARY OF THE INVENTION

In view of such problems of the prior art, a primary object of the present invention is to provide an electronically controlled advance angle control system which can associate the rotational speed or the rotational period with the advance time period by using a single small look up table in a simple manner, and can be implemented by using a relatively small storage device.

A second object of the present invention is to provide an electronically controlled advance angle control system using a look up table which can achieve a desired nonlinear relationship without complicating the algorithm or increasing the necessary memory capacity.

According to the present invention, such an object can be accomplished by providing a method for controlling an advance angle of a power engine according to a rotational speed of the engine, comprising the steps of: detecting a rotational period of the engine as a binary number consisting of a first number of bits; extracting a second number of bits from the binary number, the second number being smaller than the first number; obtaining a rotational period parameter from the extracted bits or by converting the extracted bits by an arithmetic process based on the first number, the second number, and a minimum value of the rotational period of the engine; and determining an advance angle for each given rotational speed of the engine by looking up a table specifying a relationship between the rotational period parameter and the advance angle.

By extracting a prescribed number (second number) of bits from the rotational period given as a binary number, and using this extracted bits for determining a parameter associated with a corresponding advance angle, the precision of the data decreases as the number of bits increases. In other words, a finer advance angle control is achieved as the rotational period becomes shorter or as the rotational speed increases, and a coarser advance angle control is achieved as the rotational period becomes longer or as the rotational speed decreases. This agrees with a desired pattern of precision in controlling the advance angle.

According to a preferred embodiment of the present invention, the minimum value of the rotational period of the power engine given as a binary number consists of no less bits than the extracted bits, and the step of obtaining the rotational period parameter comprises the steps of: setting the rotational period parameter as a value consisting of the extracted bits minus $2^{i-1}$ when the rotational period of the engine given as a binary number consists of a same number of bits as the minimum value, the second number being i; setting the rotational period parameter as the extracted bits when the rotational period of the engine is one bit longer than the minimum value; and setting the rotational period parameter as a value consisting of the extracted bits plus $2^{i+j-3}$ when the rotational period of the engine given as a binary number is j bits longer than said minimum value, j being two or greater.

The advance angle of a power engine consists of an advance angle of a switching signal for commutating input power to a brushless electric motor, an advance angle of an ignition timing of an internal combustion engine, or any application which requires to control a timing or a phase relationship of a certain event relative to a cyclic time reference.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
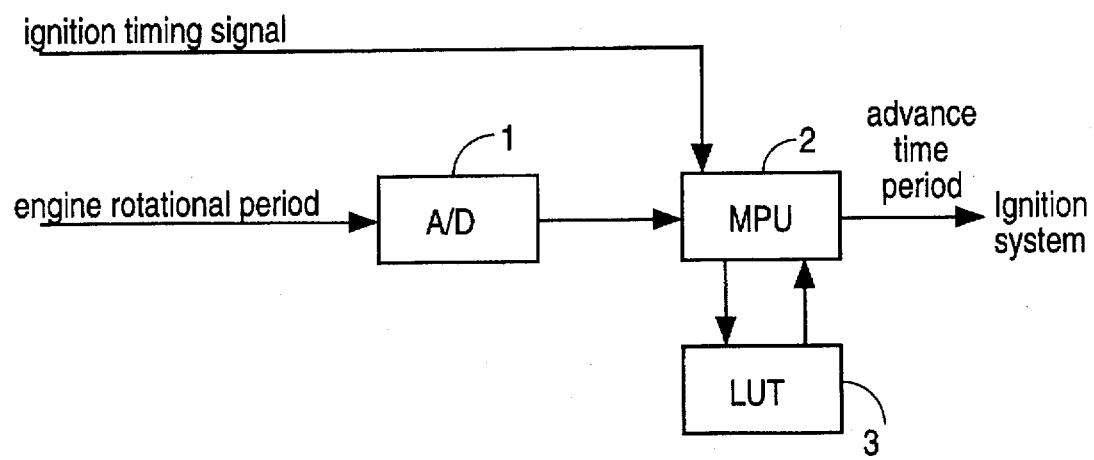
FIG. 1 is a block diagram showing the structure of an ignition control system for an internal combustion engine to which the present invention is applied.

FIG. 1 is a block diagram showing the general structure of an embodiment of the engine ignition timing control system according to the present invention. The rotation period supplied to an A/D converter 1 is converted into a 16-bit binary number (first number of bits) which is supplied to an MPU 2. Eight upper meaningful bits of this binary number (second number of bits: i) are extracted therefrom, and converted into a rotational period parameter N which is explained hereinafter. An LUT 3 defining a relationship between the parameter N and the advance time period is looked up using the parameter N as an index, and the output, or the advance time period, is supplied to an ignition system which is not shown in the drawing.

As shown in Table 1, according to the present embodiment, the minimum value of the rotational period is given as a binary number 1000 0000 0000 ($2^{11}$=2,048 in decimal), and the maximum value of the rotational period is given as a binary number 111 1111 1000 0000 (65,280 in decimal).

TABLE 1

| rotational period (16 bits) (extracted value underlined) | arithmetic operation | rotational period paratmeter N (9 bits) |
|---|---|---|
| A  0000 <u>1000 0000</u> 0000 ↓ 0000 <u>0111 1111</u> 1111 | extracted value −1000 0000 | 0 0000 0000 ↓ 0 0111 1111 |
| B  000<u>1 0000 000</u>0 0000 ↓ 000<u>1 1111 1111</u> 1111 | extracted value as it is | 0 1000 0000 ↓ 0 1111 1111 |
| C  00<u>10 0000 00</u>00 0000 ↓ 00<u>11 1111 11</u>11 1111 | extracted value +1000 0000 | 1 0000 0000 ↓ 1 0111 1111 |
| D  0<u>100 0000 0</u>000 0000 ↓ 0<u>111 1111 1</u>111 1111 | extracted value +1 0000 0000 | 1 1000 0000 ↓ 1 1111 1111 |

Now is described how eight upper meaningful bits of the rotational period given as a 16-bit binary number are extracted, and how it is converted into a corresponding value of the parameter N with reference to Table 1. First of all, as indicated by the underlines in the first column of Table 1, eight upper meaningful bits of the 16-bit binary number representing the rotational period is extracted. If the rotational period preceding the step of extraction consists of a same number of bits as the minimum value of the rotational period, the rotational period parameter N is given by subtracting $2^{i-1}=2^7$ (=1000 0000) from the extracted 8-bit binary number as in the line indicated by A in Table 1. If the rotational period preceding the step of extraction 158 consists of a binary number which is longer than the minimum value of the rotational period by one bit, the rotational period parameter N is given by the extracted 8-bit binary as it is, as shown in the line indicated by B in Table 1. If the rotational period preceding the step of extraction consists of a binary number which is longer than the minimum value of the rotational period by j bits, j being a number equal to or greater than two, the rotational period parameter N is given by adding $2^{i+j-3}$ to the extracted 8-bit binary number. For instance, in the case of the part indicated by C in Table 1, because the rotational period preceding the step of extraction is longer than the minimum value by two bits, the rotational period parameter N is given by adding $2^{i+j-3}=2^7$(=1 0000 0000) to the extracted 8-bit binary number. In the case of the part indicated by D in Table 1, because the rotational period preceding the step of extraction is longer than the minimum value by three bits, the rotational period parameter N is given by adding $2^{i+j-3}=2^8$ (=10 0000 0000) to the extracted 8-bit binary number.

As shown in the right hand side of Table 1, the rotational period parameter N is given as a (i+1)=9 bit binary number selected from a group of 512 consecutive binary numbers in the range of 0 0000 0000 (0) to 1 1111 1111 (511). Therefore, it suffices if the LUT 3 consists of a table associating 512 possible rotational period parameter values N to corresponding advance time periods which, for instance, may be given by 16 bit binary numbers (Table 1).

Figure 2:
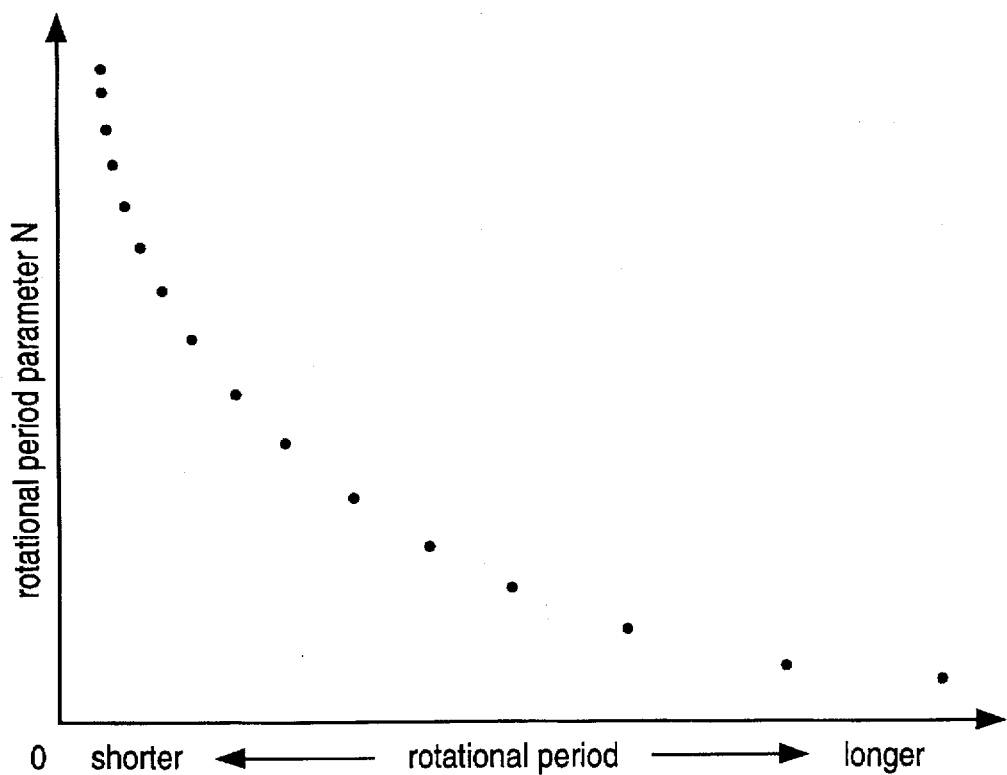
FIG. 2 is a graph showing the relationship between the rotational period parameter and the advance time period N.

Thus, the relationship between the rotational period parameter N and the advance time period can be obtained as conceptually shown in the graph of FIG. 2. More specifically, a progressively larger increase in the rotational period is necessary for producing each increment in the advance time period as the rotational period increases. In other words, as the rotational period diminishes, each decrement in the rotational period causes a progressively larger increase in the advance time period.

In this embodiment, upper eight meaningful bits were extracted from the 16-bit rotational period data, and were converted into a corresponding value of the rotational speed parameter N consisting of 9 bits. However, it is also possible to extract a different number (second number i), such as seven and nine, of bits from the rotational period parameter N which may also consist of a different number (first number), such as 15 and 17, of bits. As long as the minimum value consists of a power of 2, it is possible to achieve a high efficiency by shifting the minimum value to zero.

It is also possible to extract a second number of upper meaningful bits from a rotational period expressed by a first number of bits, and setting the extracted bits as the rotational period parameter N by filling a necessary number of zeros in lower places to achieve a similar result although the total number of bits of the rotational period parameter N may increase, and the values of the parameter may not be entirely consecutive.

Figure 3:
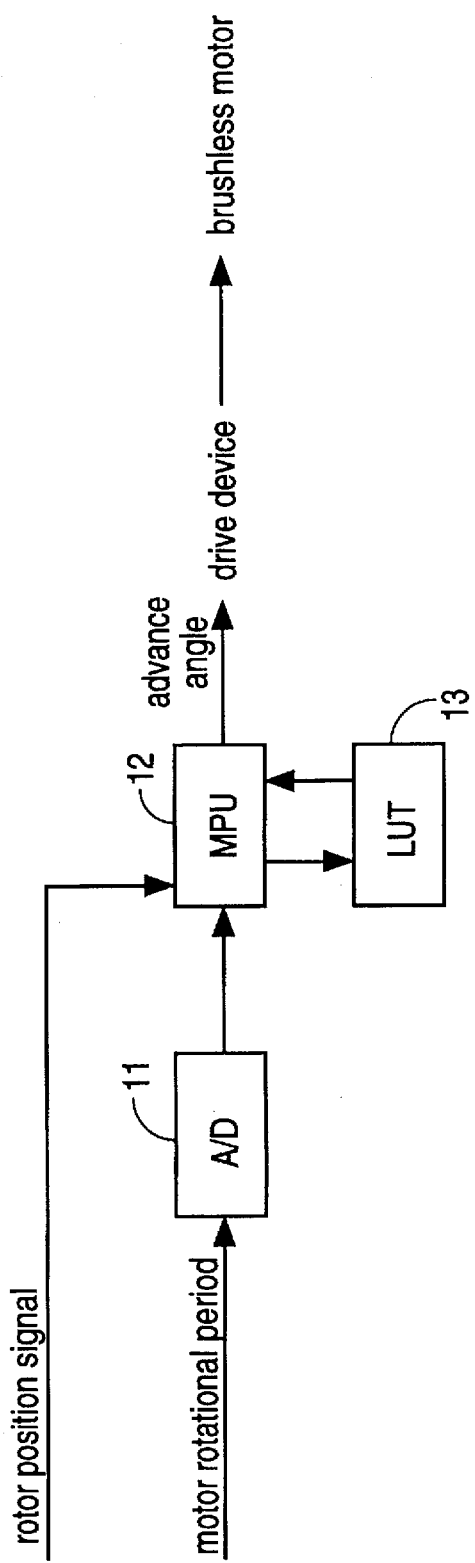
FIG. 3 is a block diagram showing the structure of an advance angle control system for a power engine to which the present invention is applied.
Figure 4:
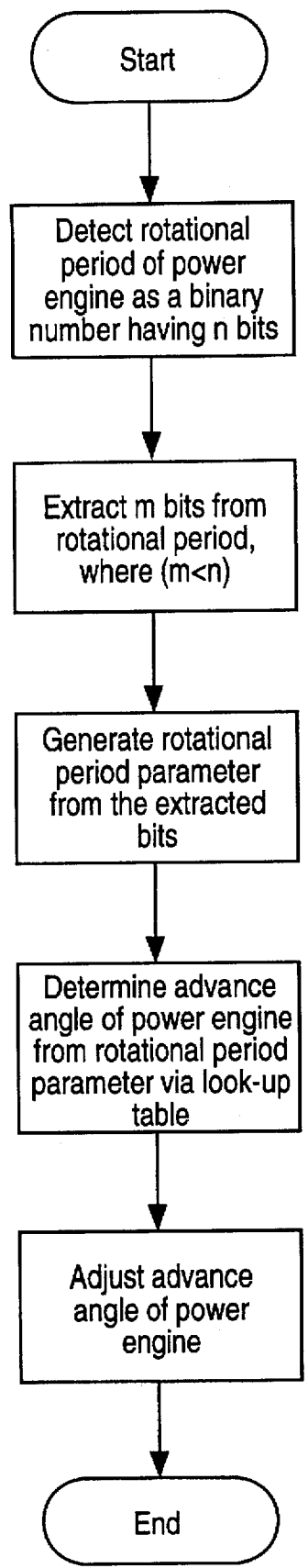
FIG. 4 is a flow diagram of a method for controlling an advance angle of a power engine, according to one embodiment of the invention.

FIG. 3 is a block diagram of drive control system for a brushless motor of an electric vehicle to which the present invention is applied. The rotational period supplied to an A/D converter 11 is converted into a 16-bit binary number (first number of bits) which is supplied to an MPU 12. Eight upper meaningful bits of this binary number (second number of bits: i) are extracted therefrom, and converted into a rotational period parameter N which is explained hereinafter. An LUT 3 defining a relationship between the parameter N and the advance time period is looked up using the parameter N as an index, and the output, or the advance time period, is supplied to a drive system which is not shown in the drawing. The mode of operation of this system is similar to that of the engine ignition control system, and is not described herein.

As can be appreciated from the above description, according to the method for controlling the advance angle of a power engine of the present invention, because of the provision of the steps of detecting a rotational period of the engine as a binary number consisting of a first number of bits; extracting a second number of bits from the binary number, the second number being smaller than the first number; obtaining a rotational period parameter from the extracted bits or by converting the extracted bits by an arithmetic process based on the binary number, the extracted bits and a minimum value of the rotational period of the engine; and determining an advance time period for each given rotational speed of the engine by looking up a table specifying a relationship between the rotational period parameter and the advance time period, it is possible to associate a rotational speed or a rotational period with an advance time period by using a small single look up table, which can be implemented by using a storage device of a small capacity. In particular, by setting the rotational period parameter as a value consisting of the extracted bits minus $2^{i-1}$ when the rotational period of the engine given as a binary number consists of a same number of bits as the minimum value, i being the number of extracted bits; setting the rotational period parameter as the extracted bits when the rotational period of the engine has a same number of bits as the minimum value; and setting the rotational period parameter as a value consisting of the extracted bits plus $2^{i+j-3}$ when the rotational period of the engine given as a binary is j bits longer than the minimum value, j being two or greater, the rotational period parameter can be given by a series of consecutive numbers consisting of the prescribed number of bits, and the look up table can be further reduced in size.

What we claim is:

1. A method for controlling an advance angle of a power engine according to a rotational speed of the engine, comprising the steps of:

detecting a rotational period of said engine as a binary number consisting of a first number of bits;

extracting a second number of bits from said binary number, said second number being smaller than said first number;

obtaining a rotational period parameter from the extracted bits or by converting the extracted bits by an arithmetic process based on said first number, said second number, and a minimum value of said rotational period of said engine;

determining an advance angle for each given rotational speed of said engine by looking up a table specifying a relationship between said rotational period parameter and said advance angle; and adjusting the advance angle of the power engine.

2. A method for controlling an advance angle of a power engine according to claim 1, wherein said minimum value of said rotational period of said power engine given as a binary number consists of no less bits than said extracted bits, and the step of obtaining said rotational period parameter comprises the step of:

setting said rotational period parameter as a value consisting of said extracted bits minus $2^{i-1}$ when said rotational period of said engine given as a binary number consists of a same number of bits as said minimum value, said second number being i;

setting said rotational period parameter as said extracted bits when said rotational period of said engine is one bit longer than said minimum value; and setting said rotational period parameter as a value consisting of said bits plus $2^{i+j-3}$ when said rotational period of said engine given as a binary number is j bits longer than said minimum value, j being two or greater.

3. A method for controlling an advance angle of a power engine according to claim 1, wherein said advance angle of the power engine consists of an advance angle of a switching signal for commutating input power to a brushless electric motor.

4. A method for controlling an advance angle of a power engine according to claim 1, wherein said advance angle of the power engine consists of an advance angle of an ignition timing of an internal combustion engine.

* * * * *